(12) United States Patent
Henkens et al.

(10) Patent No.: US 12,219,007 B2
(45) Date of Patent: *Feb. 4, 2025

(54) SELECTIVELY ADDING USERS TO CHANNELS IN A GROUP-BASED COMMUNICATION SYSTEM

(71) Applicant: Salesforce, Inc., San Francisco, CA (US)

(72) Inventors: Sarah Henkens, Mission Bay, CA (US); Britton Jamison, San Francisco, CA (US); Yoav Sion, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,418

(22) Filed: Nov. 29, 2023

(65) Prior Publication Data

US 2024/0163333 A1 May 16, 2024

Related U.S. Application Data

(63) Continuation of application No. 17/693,843, filed on Mar. 14, 2022, now Pat. No. 11,870,845, which is a continuation of application No. 17/368,921, filed on Jul. 7, 2021, now Pat. No. 11,303,705, which is a continuation of application No. 16/999,631, filed on Aug. 21, 2020, now Pat. No. 11,089,095.

(51) Int. Cl.
*G06F 15/16* (2006.01)
*G06F 9/54* (2006.01)
*H04L 29/06* (2006.01)
*H04L 67/104* (2022.01)

(52) U.S. Cl.
CPC ...... *H04L 67/1046* (2013.01); *H04L 67/1051* (2013.01); *H04L 67/1057* (2013.01); *H04L 67/1059* (2013.01)

(58) Field of Classification Search
CPC ............ H04L 67/1046; H04L 67/1051; H04L 67/1057; H04L 67/1059
USPC ....................................................... 709/204
See application file for complete search history.

(56) References Cited

U.S. PATENT DOCUMENTS

| | | | | |
|---|---|---|---|---|
| 7,941,762 | B1* | 5/2011 | Tovino | H04M 3/42365 715/708 |
| 9,210,056 | B1* | 12/2015 | Choudhary | H04L 69/329 |
| 9,396,456 | B1* | 7/2016 | Wang | G06Q 10/107 |
| 10,069,782 | B2* | 9/2018 | Jayam | H04L 51/42 |
| 2007/0112860 | A1* | 5/2007 | Ostanik | G06Q 10/107 |

(Continued)

*Primary Examiner* — Hamza N Algibhah
(74) *Attorney, Agent, or Firm* — Holland & Hart LLP

(57) ABSTRACT

Methods, media, and systems are disclosed for adding new users to a channel in a group-based communication system. The system receives a request to add new users to a channel. The system adds a new user by classifying the new user's email address domain as internal or external. If the domain is internal, the first user is added to the channel as a member, and if the domain is external, the user is prompted for a type of access for the new user. If the new user's access type is guest, the new user is added to the channel as a guest. If the type of access is shared, the channel is shared with an organization associated with the domain, and the new user is added as a member of the channel that has been shared.

20 Claims, 9 Drawing Sheets

(56) References Cited

U.S. PATENT DOCUMENTS

| | | | | |
|---|---|---|---|---|
| 2007/0283002 | A1* | 12/2007 | Bornhoevd | G06F 9/54 709/224 |
| 2008/0104032 | A1* | 5/2008 | Sarkar | G06F 16/958 707/999.102 |
| 2008/0239979 | A1* | 10/2008 | Chou | G06F 11/3495 370/252 |
| 2009/0049177 | A1* | 2/2009 | Iszlai | G06Q 10/1093 705/7.18 |
| 2011/0052155 | A1* | 3/2011 | Desmarais | H04N 21/4788 386/280 |
| 2011/0213974 | A1* | 9/2011 | Ardon | H04L 63/0807 713/169 |
| 2011/0225463 | A1* | 9/2011 | Davis | G06F 11/1438 718/102 |
| 2011/0314326 | A1* | 12/2011 | Mahajan | G06F 11/3006 714/E11.073 |
| 2012/0058742 | A1* | 3/2012 | Razoumov | H04L 41/5058 455/406 |
| 2013/0290188 | A1* | 10/2013 | Olliphant | G06Q 20/3223 705/44 |
| 2013/0339123 | A1* | 12/2013 | Ennis | G06Q 30/0225 705/14.26 |
| 2014/0173398 | A1* | 6/2014 | Beust | G06F 40/134 715/205 |
| 2014/0278624 | A1* | 9/2014 | Steiner | G06Q 10/107 705/7.12 |
| 2015/0067147 | A1* | 3/2015 | Carmel | G06F 11/0709 709/224 |
| 2015/0170045 | A1* | 6/2015 | Kirkham | G06Q 10/06 706/11 |
| 2015/0350349 | A1* | 12/2015 | Kao | G06Q 30/0282 709/204 |
| 2016/0142262 | A1* | 5/2016 | Werner | H04L 41/22 709/224 |
| 2017/0249059 | A1* | 8/2017 | Houseworth | G10L 15/26 |
| 2018/0026856 | A1* | 1/2018 | Yang | H04L 41/0893 709/224 |
| 2019/0286462 | A1* | 9/2019 | Bodnick | G06F 9/453 |
| 2020/0252743 | A1* | 8/2020 | Bellhy | G06Q 30/0208 |
| 2020/0412732 | A1* | 12/2020 | Muthukrishnan | H04L 61/3025 |

* cited by examiner

SELECTIVELY ADDING USERS TO CHANNELS IN A GROUP-BASED COMMUNICATION SYSTEM

RELATED APPLICATIONS

This patent application is a continuation application claiming priority benefit, with regard to all common subject matter, of U.S. patent application Ser. No. 17/693,843, filed Mar. 14, 2022 and entitled "SELECTIVELY ADDING USERS TO CHANNELS IN A GROUP-BASED COMMUNICATION SYSTEM," which is a continuation of U.S. patent application Ser. No. 17/368,921, filed Jul. 7, 2021 and entitled "SELECTIVELY ADDING USERS TO CHANNELS IN A GROUP-BASED COMMUNICATION SYSTEM," which is a continuation of U.S. patent application Ser. No. 16/999,631, filed Aug. 21, 2020 and entitled "SELECTIVELY ADDING USERS TO CHANNELS IN A GROUP-BASED COMMUNICATION SYSTEM." The above-referenced application is hereby incorporated by reference in its entirety into the present application. This application also shares certain subject matter with U.S. patent application Ser. No. 16/821,514, filed on Mar. 17, 2020 and entitled "Methods and Apparatuses for Managing External Approval Provisioning and External Messaging Communication Requests in a Group-Based Communication System," and U.S. patent application Ser. No. 16/852,202, filed on Apr. 17, 2020 and entitled "Improved Direct Messaging Instance Generation," the entirety of which are hereby incorporated by reference.

TECHNICAL FIELD

Embodiments of the invention generally relate to adding new users to a group-based communication system and, more particularly, to techniques for selectively adding users to channels in a group-based communication system.

Historically, adding users to a group-based communication system required an existing, requesting user to understand the various types of channel memberships in the group-based communication system. When adding a new user, the requesting user adds a number of new users directly to a channel, provided that the requesting user is authorized to do so. If the users to be added are part of the requesting user's organization, it would typically be appropriate for the new users to be added as regular members based on the new users being a part of the organization. On the other hand, if these users are from external organizations, rather than adding a new user to a channel as a channel member, it may be appropriate to invite them as a guest with limited access privileges. However, in certain circumstances, it may instead be appropriate for the requesting user to instead share the channel with the external organization and then invite the user to be added to join the channel that has been shared. All of these options for adding a new member to a channel may be confusing to the requesting users, particularly when a number of new users are being added in a batch and different users should be added differently.

SUMMARY

Embodiments of the invention facilitate bringing new users into a group-based communication system. Embodiments of the invention receive identifiers that are associated with a new user to be added to a group-based communication system associated with a host organization. The identifiers may include names, usernames, and email addresses. In some embodiments, a domain associated with one of the email addresses may be used to determine whether the new user is internal or external to the host organization. In some embodiments, when the new user is internal, the new user may be added to a group-based communication channel directly as a regular member. Alternatively, if the new user is external to the host organization, the group-based communication channel may be shared with the external organization of the new user, with the new user being added to the channel that has been shared. Alternatively, the new user may be directly added to the group-based communication channel as a guest with restricted permissions.

In particular, in a first embodiment, the invention includes one or more non-transitory computer-readable media storing computer-executable instructions that, when executed by a processor, perform a method for adding new users to a channel of a group-based communication system, the method comprising: receiving, from a requesting user of the group-based communication system, a request to add a plurality of new users to the channel of the group-based communication system, the request comprising a plurality of identifying indicia corresponding to the plurality of new users, and adding a new user associated with an identifying indicium of the plurality of identifying indicia by: in response to determining a domain associated with an email address corresponding to the identifying indicium, classifying the domain as internal to a first organization associated with the channel or external to the first organization, if the domain is internal to the first organization, adding the new user to the channel as a member, and if the domain is external to the first organization: prompting the requesting user for a type of access required by the new user, if the type of access is guest, inviting the new user to the channel as a guest, and if the type of access is shared, sharing the channel with a second organization associated with the domain and adding the new user as a member of the channel that has been shared.

In a second embodiment, the invention includes a method comprising: receiving, from a requesting user of a group-based communication system, a request to add a plurality of new users to a channel of the group-based communication system, the request comprising a plurality of identifying indicia corresponding to the plurality of new users, and adding a new user associated with an identifying indicium of the plurality of identifying indicia by: in response to determining a domain associated with an email address corresponding to the identifying indicium, classifying the domain as internal to a first organization associated with the channel or external to the first organization, if the domain is internal to the first organization, adding the new user to the channel as a member, and if the domain is external to the first organization: prompting the requesting user for a type of access required by the new user, if the type of access is guest, inviting the new user to the channel as a guest, and if the type of access is shared, sharing the channel with a second organization associated with the domain and adding the new user as a member of the channel that has been shared.

In a third embodiment, the invention includes a system comprising at least one processor and at least one non-transitory memory storing computer executable instructions that when executed by the processor cause the system to carry out actions comprising: receiving, from a requesting user of a group-based communication system, a request to add a plurality of new users to a channel of the group-based communication system, the request comprising a plurality of identifying indicia corresponding to the plurality of new users, and adding a new user associated with an identifying indicium of the plurality of identifying indicia by: in response to determining a domain associated with an email address corresponding to the first identifying indicium, classifying the domain as internal to a first organization associated with the channel, if the domain is internal to the first organization or external to the first organization, adding the new user to the channel as a member, and if the domain is external to the first organization: prompting the requesting user for a type of access required by the new user, if the type of access is guest, inviting the new user to the channel as a guest, and if the type of access is shared, sharing the channel with a second organization associated with the domain and adding the new user as a member of the channel that has been shared.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
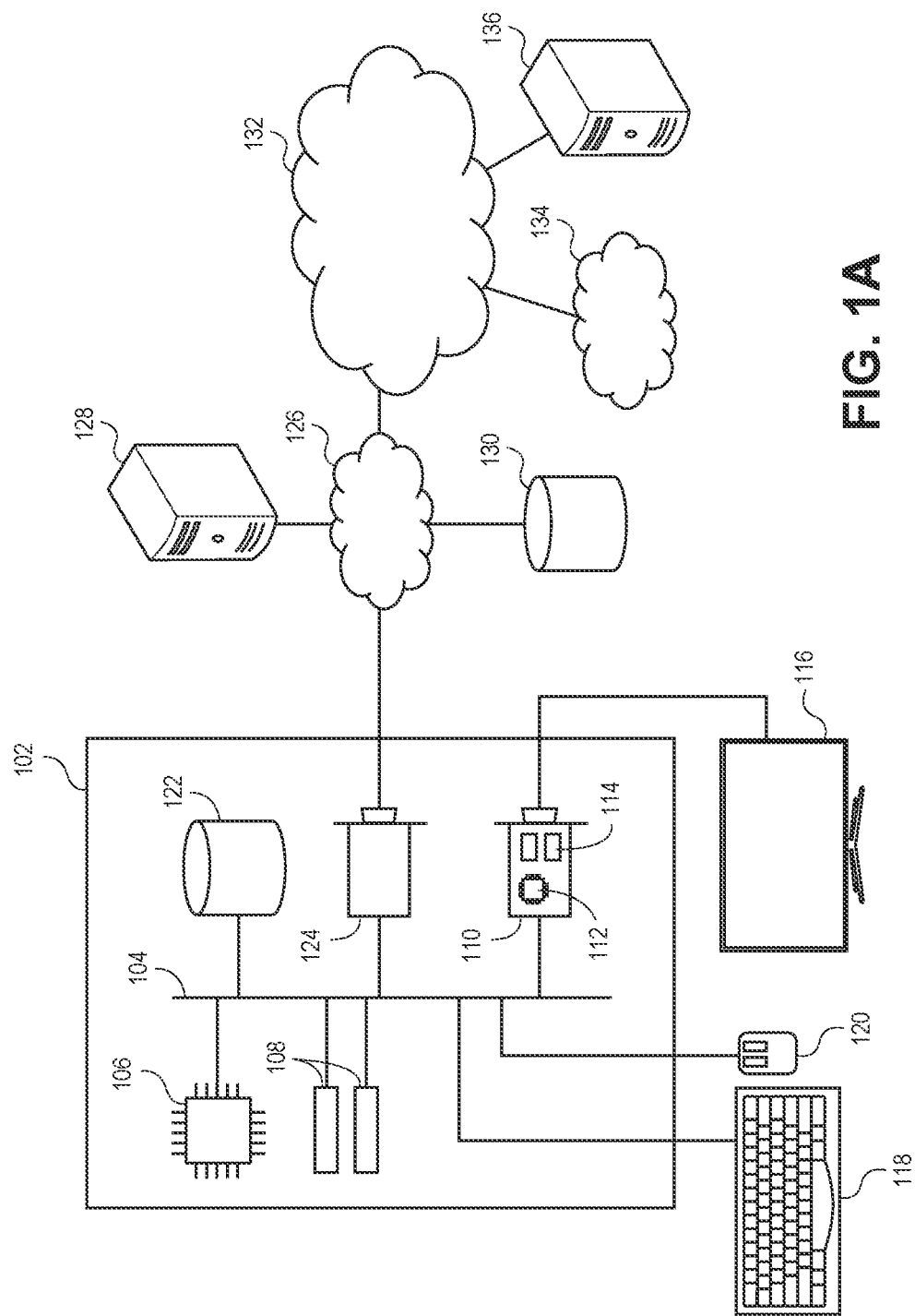
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention utilize information about new users being added to channels as well as information contained within the group-based communication system to guide requesting users to an optimal strategy for adding new users by way of a constantly evolving data store that is continually refined by means of machine learning. The requesting user's user experience is greatly improved when the requesting user takes the action of adding new users. Instead of having to research and understand the intricacies of possible alternative workflows for adding new users to a group-based communication system, the requesting user simply selects an option such as an "add people" button in the sidebar of the requesting user's client user interface and is guided by the machine learning disclosed herein and embedded into the group-based communication system of the disclosed embodiments.

Specifically, for added users who are determined to be internal to the user's domain (e.g., if the requesting user is an employee of a particular enterprise, trying to add a colleague at that particular enterprise), embodiments of the invention suggest adding the colleague to the channel as a member (with invitations to the workspace sent when the user to be added has not yet been added to the group-based communication system). For users who are determined to be external, embodiments of the invention present the requesting user with a selection for sharing the channel with the user's organization. As set forth in detail below, embodiments of the invention describe and enable classification engines that are utilized to automatically determine whether a particular new user should be treated as an internal or external user with respect to the workspace of a particular organization.

At a high level, embodiments of the invention facilitate adding new users to channels in a group-based communication system without requiring the requesting user to understand the internal implementation of the group-based communication system, which improves the user experience for the requesting user. In cases where multiple external users would be added as guests to a group-based communication system, the guest access details would have to be maintained on an on-going basis by administrators of the group-based communication system, resulting in wasteful use of administrative resources and duplicate storage of permissions and authorization information.

Not only colleagues and employees of the same enterprise should be considered internal but also certain other users from other enterprises that are closely integrated within a particular enterprise should nevertheless be considered as "internal" users. Embodiments of the invention are able to utilize configuration information within the group-based communication system in connection with machine learning to accurately determine when such users should be treated as internal, thus conserving resources and improving the user experience.

Additionally, aspects of the disclosed classification engines conserve bandwidth between network nodes and clients and servers within the group-based communication system as well as increasing the overall performance of the group-based communication system. As part of the machine learning aspects of the disclosed classification engines, the classification engine to refine its provided classifications over time based on continually evolving information within the group-based communication system information about users and their interactions with one another (e.g., messages posted to channels, direct messages, meetings scheduled together in calendar systems, or common videoconferences).

This evolving process does not require a new computation of a classification every millisecond, second, or even minute. Relationships between users evolve over hours and days as users are added and interact with one another. Accordingly, another aspect of machine learning is for the group-based communication system to compute a frequency of classification inflection (meaning how often a classification for a particular user would change) so that a period based on the classification inflection frequency can be applied to a cache refresh duration. In various embodiments, aspects of the group-based communication system that rely on classification information from a classification engine will cache the classifications for a period consistent with the cache refresh duration so as to reduce bandwidth to the classification engine and to increase performance of the client interface. When a classification is cached in this way, it does not require an API round-trip to the classification engine, thereby increasing the interactive responsiveness at the client user interface.

Operational Environment for Embodiments of the Invention

As used herein, the term "group-based communication system" refers to a collaborative communication system used within an organization and to connect to one or more external organizations. In some examples, the group-based communication system is a channel-based messaging platform. Within the group-based communication system, communication may be organized into "channels," each dedicated to a particular topic or set of users. Channels are generally long-lasting, persistent discussions of that particular topic or for that particular set of users, rather than the ad hoc, ephemeral conversations of conventional messaging applications. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are persistent and limited to a particular topic or group, users can quickly and easily refer back to previous communications for reference.

Communication data within the group-based communication system server may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's transmissions using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or, organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin New), a username (e.g., a_new), a password, user preferences and/or settings, a time zone, a status, a token, and other user-specific information. In some examples, the data store may additionally or alternatively store permissions data associated with permissions of individual users of the group-based communication system. In some examples, permissions can be set by the group-based communication system, an employer, enterprise, organization or other entity that utilizes the group-based communication system, a team leader, a group leader, an individual user, or other entity. In some examples, permissions associated with an individual user can be mapped to, or otherwise associated with, an account or profile associated with the user data. In some examples, permissions can indicate which users can communicate directly with other users, which channels a user is permitted to access, restrictions on individual channels, which workspaces the user is permitted to access, restrictions on individual workspaces, and any other restrictions. In some embodiments, the permissions can support the group-based communication system by maintaining security for limiting access to a defined group of users. In some such embodiments, such users can be defined by common access credentials, group identifiers, or other criteria, as described above.

A data store may additionally or alternatively store workspace data, which may be part of the communication data. In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some examples, workspaces can be associated with one or more organization identifiers, which can be associated with organizations or other entities associated with the group-based communication system. In some examples, such data can be mapped to, or otherwise associated with, other types of data in the data store (e.g., user data, permission data, or channel data).

The data store may additionally or alternatively store channel data, which can be part of the communication data. Channel data may store data associated with individual communication channels. In some embodiments, the host communication application can establish a communication channel between and among various user computing devices, allowing the user computing devices to communicate and share data between and among each other. In some embodiments, a communication channel identification may be assigned to a communication channel, which indicates the physical address in the data store where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators). In some embodiments, a communication channel may be "shared," which may allow users associated with different organizations (e.g., entities associated with different organization identifiers) to join and participate in the data sharing through the communication channel. Channels that have been shared with external organizations may be public such that they are accessible to any user of either organization, or they may be private such that they are restricted to access by certain users or users having particular roles from both organizations. In some embodiments, each organization may set different policies for data access and retention for its data in the channel that has been shared with the respective organization. In some examples, the data store may be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some embodiments, data shards can be associated with organizations, groups (e.g., workspaces), communication channels, users, or any other way to logically partition data. In this way, data shards can improve the performance of the group-based communication system.

In some embodiments, individual organizations can be associated with a database shard within the data store that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a channel that has been shared with one or more of the organizations).

In some embodiments, a channel can be associated with a database shard within the data store that stores data related to a particular channel identification. For example, a database shard may store electronic communication data associated with the communication channel, which enables members of that particular channel to communicate and exchange data with other members of the same channel in real time or near-real time. In this example, a group or organization can be the owner of the database shard and can control where and how the related data is stored.

There are several ways to add new users to a group-based communication system. First, a requesting user may add the new user to a channel as a regular member, which is particularly straightforward if the new user is already a member of a particular organization's workspace. Next, the requesting user may invite the new user to a join a workspace (e.g., as a member, a single-channel guest, or a multi-channel guest). Alternatively, the requesting user may wish to share the channel with an external organization. These differences have can significant consequences in terms of optimizing how users collaborate and interact; however, the actual consequences may not be apparent in advance to anyone other than experts or power users of a particular group-based communication system, and any particular requesting user may not be an expert or a power user.

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Operation of Embodiments of the Invention

Turning first to FIG. 1A, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over public Internet 132. Local network 126 is in turn connected to public Internet 132, which connects many networks such as local network 126, remote network 134 or directly attached computers such as computer 136. In some embodiments, computer 102 can itself be directly connected to public Internet 132.

Figure 1B:
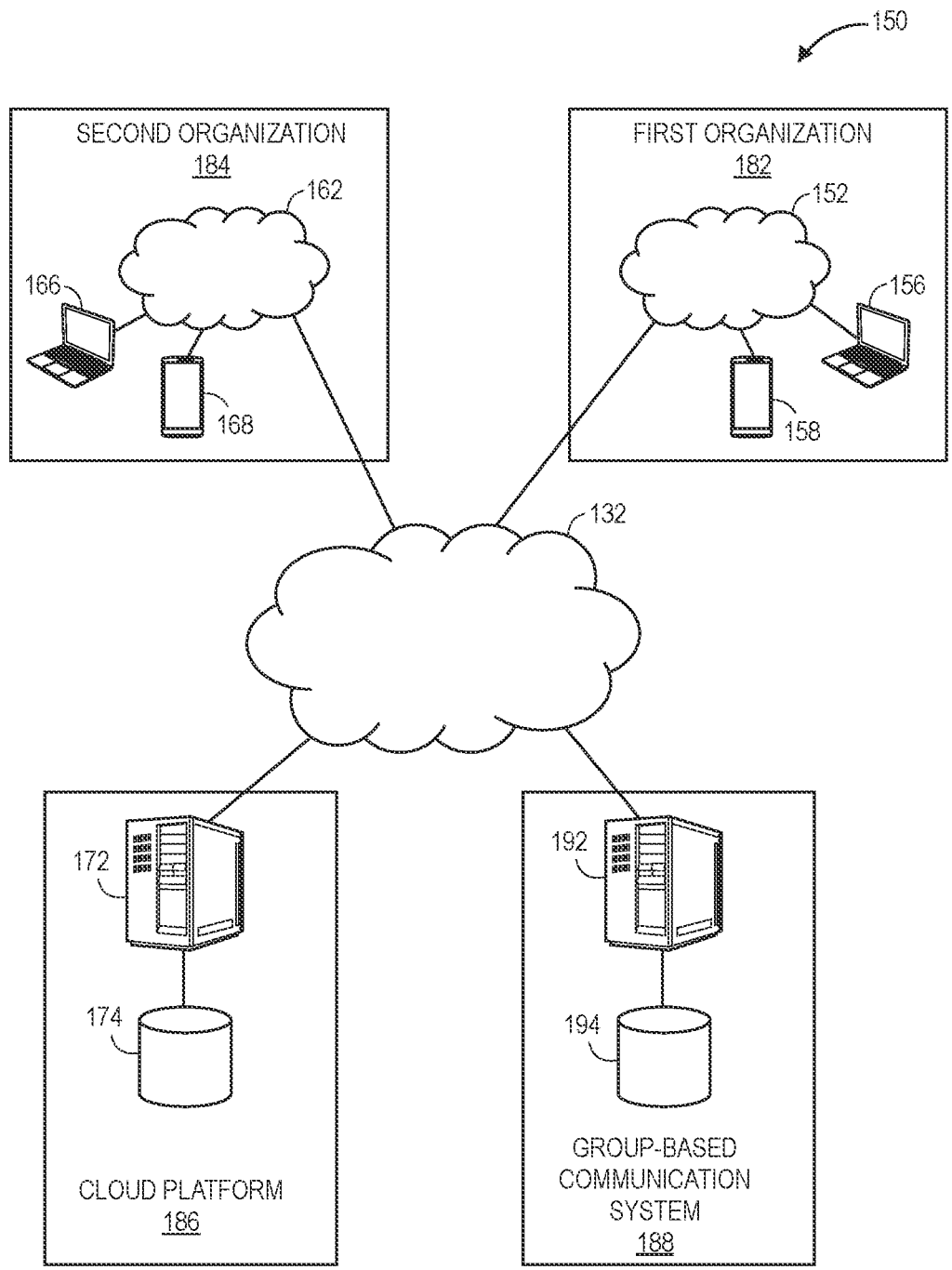
FIG. 1B depicts a system figure illustrating the elements of a system for carrying out embodiments of the invention.

Turning now to FIG. 1B, an exemplary diagram illustrating the components of a system for carrying out embodiments of the invention is depicted and referred to generally by reference numeral 150. System 150 comprises a number of organizations, including a first organization 182, a second organization 184, and cloud platform 186. As used herein, the cloud platform 186 can be any cloud software platform providing services to users within the first organization 182 and/or the second organization 184. Examples of the cloud platform 186 are cloud storage solutions such as Dropbox® from Dropbox, Inc. of San Francisco, California or cloud application services such as G Suite® from Google LLC of Mountain View, California. The cloud platform 186 provides services by way of cloud platform server 172 and cloud platform data store 174. The cloud platform data store 174 stores at least a portion of the data for the cloud platform, including email message data, calendar data, as well as other cloud platform user data.

In various embodiments, within group-based communication system 188 is group-based communication system server 192, which is communicatively coupled to group-based communication system data store 194. As depicted, group-based communication system server 192 is directly connected to group-based communication system data store 194; however, embodiments where group-based communication system server 192 is connected to group-based communication system data store 194 (as, for example, where group-based communication system data store 194 is network-based storage or cloud storage) are also contemplated. Group-based communication system data store 194 stores at least a portion of the data for the group-based communication system, including message data, group (or channel) data, and user data.

The group-based communication system server 192 is communicatively coupled to client devices 156, 158, 166, and 168 via the public Internet 132, by way of the clients' respective internal networks first internal network 152 and second internal network 162, which may be a local area network (LAN), a wide-area network (WAN), a virtual private network (VPN) or any other type of digital communications network. Broadly speaking, any type of network for providing communication between the various components of system 150 is contemplated. Group-based communication system server 192 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 194 is communicatively connected to the group-based communication system server 192. As depicted, and in various embodiments, group-based communication system data store 194 is directly connected to group-based communication system server 192; however, any form of communicative connection (for example, a LAN connection for network-attached storage (NAS) or a network file system (NFS), or an Internet connection for cloud-based storage) can be employed. Broadly speaking, group-based communication system data store 194 stores at least a portion of the information used by group-based communication system server 192. For example, group-based communication system data store 194 may store all of the messages with their associated channels, documents and images uploaded to particular channels, channel membership information (as well as member permission and authorization information), and/or user information.

As noted, multiple group-based communication system servers may be present in system 150. In such embodiments, each group-based communication system server may have its own copy of group-based communication system data store 194. Alternatively, multiple group-based communication system servers may share a single network-attached data store. Alternatively, or in addition, in any of these embodiments, data may be sharded across multiple data stores or database management systems (DBMS) such as, for example, a DBMS that is capable of deploying, scaling and managing large clusters of database instances, supporting various database server technologies.

Turning now to the first organization 182, first client device 156 is connected to a first internal network 152 which is itself connected directly or indirectly to the public Internet 132. Broadly speaking, the first client device 156 can be any type of computing device discussed above with respect to FIG. 1A; however, in a typical embodiment, the first client device 156 may be a desktop computer, laptop computer, or mobile device such as a smartphone. The first client device 156 allows a user to interact with the group-based communication system 188. In some embodiments, the first client device 156 may be running dedicated software for the group-based communication system 188. In other embodiments, the user may access the group-based communication system server by visiting a website using a web browser on the first client device 156.

A first smartphone client device 158 is similarly connected to the first internal network 152 within the first organization 182. Although only two client devices, namely the first client device 156 and the first smartphone client device 158 are depicted in connection with the first organization 182, the first organization 182 may have any number of client and server devices connected to the first internal network 152.

Turning now to the second organization 184, second client device 166 is connected to a second internal network 162 associated with the second organization 184, which is itself connected to the public Internet 132. Similar to the first client device 156 described above, the second client device 166 can be any type of computing device; however, in a typical embodiment, the second client device 166 may be a desktop computer, laptop computer, or mobile device such as a smartphone. The second client device 166 allows a user associated with the second organization to interact with the group-based communication system 188. In some embodiments, the second client device 166 may be running dedicated software for interfacing with the group-based communication system 188.

In other embodiments, the user may access the group-based communication system server 192 by visiting a website using a web browser on the second client device 166. Smartphone client device 168 is similarly connected to the second internal network 162 within the second organization 184 and may similarly include dedicated software (such as a smartphone app) or a web browser for interfacing with the group-based communication system 188. Although only two client devices, namely the second client device 166 and the second smartphone client device 168 are depicted in connection with the second organization 184, the second organization 184 may have any number of client and server devices connected to the second internal network 162.

In various embodiments, the cloud platform 186 hosts services such as cloud file storage, calendar services, video conferencing, social media services, or cloud email services. In particular, in some embodiments, the cloud platform 186 hosts personal email accounts for users of the group-based communication system 188.

Figure 2A:
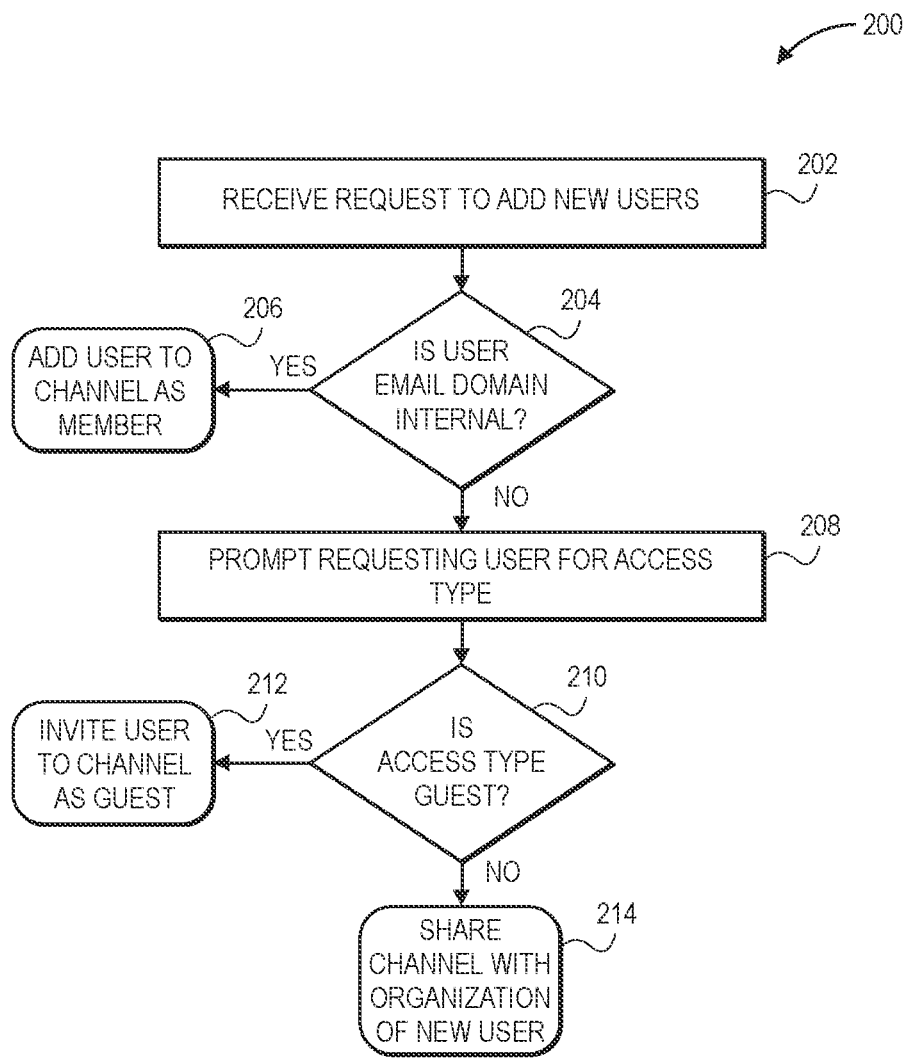
FIG. 2A depicts an exemplary flowchart illustrating the operation of a method in accordance with one embodiment of the invention.

Turning now to FIG. 2A, an exemplary flowchart illustrating the operation of a method in accordance with one embodiment of the invention is depicted and referred to generally by reference numeral 200. Method 200 takes place in the context of a group-based communication system. Method 200 begins at a step 202, where the system receives a request to add new users. In some embodiments, this request comes from a user who is a member of a particular channel (for example, the user who initially created the channel). In other embodiments, the request comes from an administrator of the group-based communication system as a whole (for example, an information technology manager). In yet further embodiments, this request comes from a user who is a regular member of the particular channel, having permission to add an internal or external user to the channel. In some embodiments, an external user can be added to a channel in at least three ways: (i) as a single-channel guest; (ii) as a multi-channel guest; or (iii) through a channel that is shared with the external user's organization.

Processing then proceeds to step 204 where the system determines whether a particular email domain is internal or external. In various embodiments, determining whether a particular email domain is internal or external is carried out by a classification engine, such as the classification engine further described below in connection with FIG. 4. In some embodiments, the classification engine is available to be queried in connection with a web services API endpoint, such as "emails.info." In some such embodiments, The API endpoint is accessible at a public URL which receives HTTP POST messages. In some embodiments, the endpoint is encrypted using transport layer security (TLS). In some embodiments, the API parameters corresponding to the POST message comprise a JavaScript Object Notation format (JSON) list of email addresses. In some such embodiments, a successful response to the API call is provided in the form of a JSON object with a parameter "ok" corresponding to true or false and a JSON list of emails with a parameter of "email" corresponding to the email address and a parameter of "type" corresponding to internal or external. In some embodiments, where an email address is determined to be invalid, an additional value for the "type" parameter of corresponding to invalid may be returned.

If the email domain is determined to be an internal domain, processing proceeds to step 206, whereupon the user is added to the channel as a regular member, having the authorizations consistent with the authorizations of the other regular members of the channel. In various embodiments, if the email domain is determined not to be internal, it is considered to be external, and processing proceeds to step 208. In some single-workspace embodiments, an internal/external determination is made based on whether the user to be added shares an email address domain with an existing user in the workspace. Where the user to be added does have an email address domain that is already present in the workspace, the user to be added will be deemed internal. In some embodiments where a single organization includes multiple organizations, the email address domain comparison is done at the organization level. Accordingly, in some of the embodiments where a single organization uses multiple email domains, if the user to be added has an email address domain that matches that of a user in a different workspace but in the same overarching organization, the user will be deemed to be internal.

In alternative embodiments, a user having the same email address domain as an existing user of a particular channel may nevertheless be considered external. For example, jon.cpa@acme.com may be in the accounting department, and jill.ece@acme.com may be in engineering and therefore be treated as being from separate organizations within the Acme enterprise. In various embodiments, the classification engine uses human resources directory information (or information derived from any other directory) to make the internal or external classification decision.

At step 208, the requesting user is prompted for an access type. Since the user email domain was determined at the above step not to be internal, the system will not automatically add the new user to the channel and will treat the new user as an external user. In various embodiments, the external user may be added to the group-based communication system in various ways. One such way to add the external user to the group-based communication system is as a guest. Alternatively, the user may be invited to join the requesting user's workgroup and be added to the channel as a regular member, such as in the case where the external user has a special relationship with the organization of the requesting user, such as a management consultant. In various embodiments, the prompting for access type is carried out by way of a modal user interface component that suggests various possible access types based on a predicted response by the requesting user. In various embodiments, the requesting user is provided with fewer than the full suite of possible choices to improve and simplify the user experience. In such a case, an additional user interface component such as a button or other field with a label such as "more options" may be provided. In such embodiments, if the requesting user selects an option that was not originally presented to the requesting user, the group-based communication system stores this event and based on the event, presents the selected option as one of the options the next time the requesting user attempts to add a new user to the system. In some such embodiments, one of the originally presented (but not selected) options is removed from the set of presented options for that user. In various embodiments, the options are similarly altered for other users in the requesting user's organization.

At step 210, the provided access type is evaluated. In various embodiments, the options presented will be to add the user as a guest or to share the channel with the new user's organization. As noted above, other options may be selected by the requesting user, which will ultimately determine how the user is actually added.

If the provided access type is guest, processing proceeds to step 212 and the new user is invited to the channel as a guest. On the other hand, if the type of the user is not a guest, then the system will share the channel with the new user's organization, and (if necessary) send a corresponding invitation at step 214 to the new user (at the new user's email address associated with the external organization) to join the workspace associated with the external organization as well as the channel that has been newly shared.

Figure 2B:
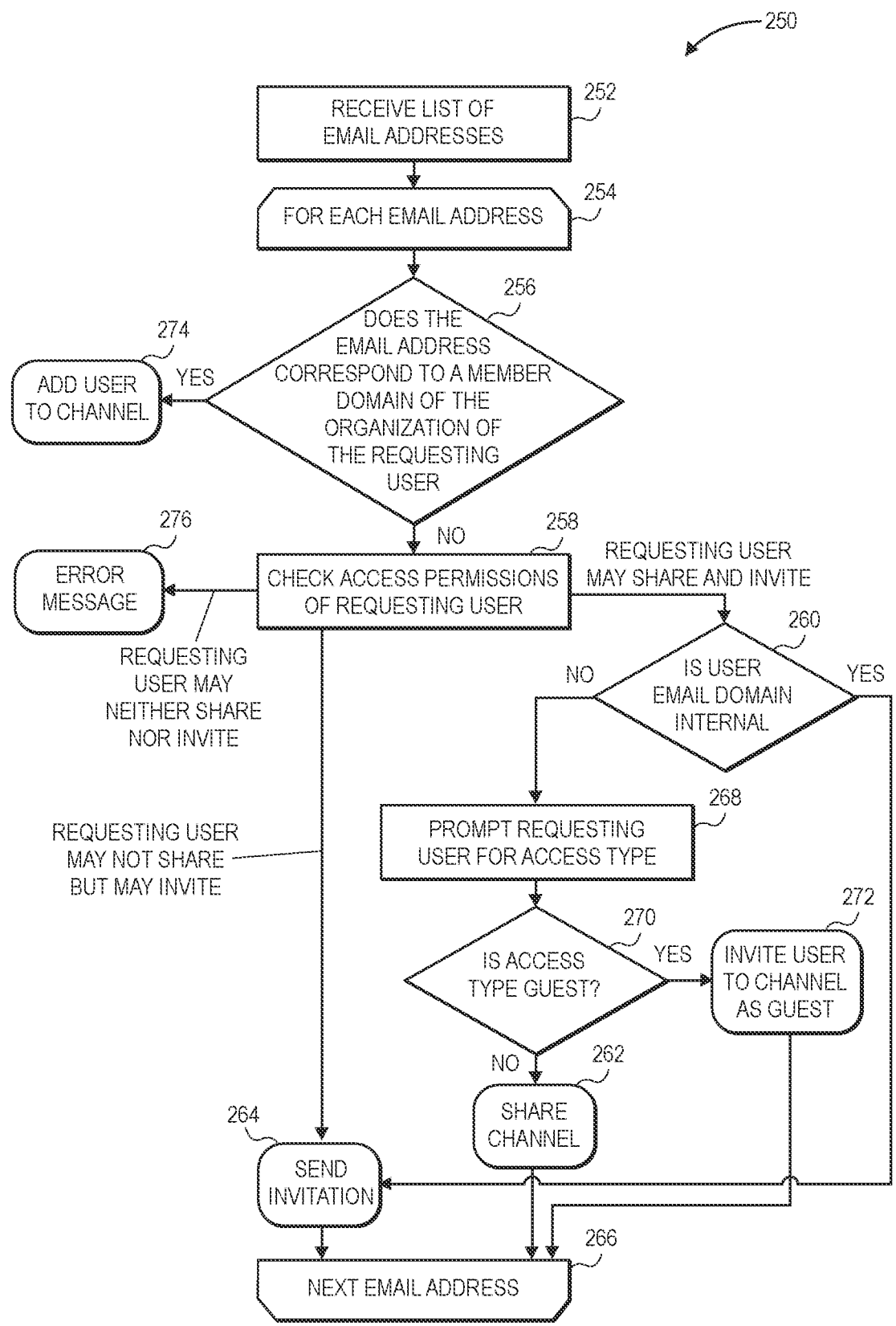
FIG. 2B depicts a flowchart illustrating the operation of an exemplary method for processing a list of email addresses to be added in a group-based communication system.

Turning now to FIG. 2B, a flowchart illustrating the operation of a method for adding a new user to a channel by selectively classifying domains is depicted and referred to generally by reference numeral 250. In various embodiments, the selective classification is carried out in connection with a classification engine, which is further described below in connection with FIG. 4. The method begins at step 252, when a request is received including a list of email addresses corresponding to new users to be added to the group-based communication system. In some embodiments, this list is generated by a requesting user providing identifying indicia corresponding to each user in the list of new users. In various embodiments, the identifying indicia are given- and/or family-names associated with one or more of the users. In other embodiments, the identifying indicia are user identifiers and/or usernames associated with one or more of the users. In still other embodiments, the identifying indicia are directly entered email addresses. In yet other embodiments, the identifying indicia include a mix of names, other user identifiers, and email addresses. Broadly speaking, any information usable to determine an email address is contemplated as use for an identifying indicium. In some embodiments, the identifying indicia are provided in connection with a user interface component as described in connection with FIG. 6, below. For each identifying indicium received, a corresponding email address is determined and added to the list.

Next, processing proceeds to loop 254, which iterates though each email address in the list of email addresses received at step 252 above. In some embodiments, the emails are parsed and processed individually. In an alternative embodiment, the email addresses are grouped by email address domain. In another alternative embodiment, the email addresses are grouped according to an attribute associated with the user's profile such as the line of business or department in which that the user works (e.g., accounting or engineering).

Next, at test 256, the system evaluates whether a particular email address to be added is in a member list associated with the channel. In various embodiments, metadata associated with channel membership is maintained in the form of a list of email address domains of the users already in the channel and a count of users corresponding to that email address domain. Accordingly, if the user to be added has an email address domain that occurs in this list with a count greater than zero, it means that the new user's email address domain is already associated with the channel. Alternatively, the system determines whether the email address is in a list of members associated with the workspace that contains the channel to which the user is intended to be added. This may be the case, for example, if the new user already belongs to another channel in the workspace. If the email address is found to be in the relevant member list, the user is added to the channel as a member at step 274.

Alternatively, if the particular email address is not found in the member list at test 256, the system checks the permissions of the requesting user at step 258. In some embodiments, permissions associated with users of the group-based communication system are stored in connection with a user profile corresponding to the user. In other embodiments, permissions and authorizations are stored as metadata in connection with other channel metadata associated with the particular channel. In still other embodiments, such authorization and permission information for the requesting user are stored in an authorization and configuration data store associated with the corresponding workspace.

If the system determines that the requesting user has neither the permissions to invite users nor to share channels externally, the system generates an error message at step 276 indicating, for example, that the requesting user cannot carry out the requested action and that the requesting user should contact a system administrator. If the system determines that the requesting user may invite users to the channel or workspace, then a corresponding invitation is sent at step 264. In various embodiments, if the email address associated with the user to be added is not associated with the group-based communication system, an email is sent by the group-based communication system with a link for the user to create an account in the group-based communication system. Alternatively, if the user to be added already has an account in the group-based communication system, the user to be added is sent a message within the group-based communication system with a link to join the workspace to which the user is being invited.

On the other hand, if the system determines that the requesting user has permissions to share a channel externally but not invite new users to the workspace or channel, then at step 262, the channel is shared with the organization associated with the new user, and the new user is invited to join the channel that has been shared. In various embodiments, an additional administrative approval is required to share some or all channels externally. In that case, if the requesting user is not an administrator, a message will be sent to one or more administrators of the workgroup requesting approval to share the channel externally. In various embodiments, an administrator can pre-configure an approved list of domains to which channels can be shared without a separate, additional administrative approval.

Finally, if the system determines that the requesting user is authorized and/or has permissions to both share the channel and invite members, the system determines whether a domain associated with the new user's email address is internal or external. In various embodiments, this determination is made by the group-based communication system by making one or more API calls to a classification engine that responds with a corresponding classification determination. If, at test 260, the email address is determined to be external, the user may be prompted for a preferred access type, as depicted at step 268. If, at test 270, the requesting user preference is that the new user should be added as a guest, the new user is invited to the channel as a guest at step 272. Otherwise, the channel is shared at step 262. In various embodiments, if the system determines that the email address is external and the channel should be shared, a user interface component is provided to the requesting user so that the requesting user can confirm that the channel should be shared externally.

If the email address is found not to be external (i.e., if it is internal), then the user is invited to join the channel at step 264. In various embodiments, if both internal and external email addresses are found in the list of email addresses that are initially received at step 252, then the internal addresses are added to the channel as regular members, and optionally, the requesting user may be presented with a prompt such as "Do you want to share the channel externally or invite the external users to the internal workspace?" rather than prompting (as in test 268) for each individual user. In various embodiments, if the email addresses have been grouped, the prompt provides options to be carried out on the group. In some embodiments, an additional user interface control is provided with a label such as "ungroup" so that the requesting user can ungroup the email addresses and take action individually on each user to be added. Finally, at loop end 266, processing returns to the beginning of loop 254 to process the next email address in the list of email addresses provided at step 252.

Figure 3:
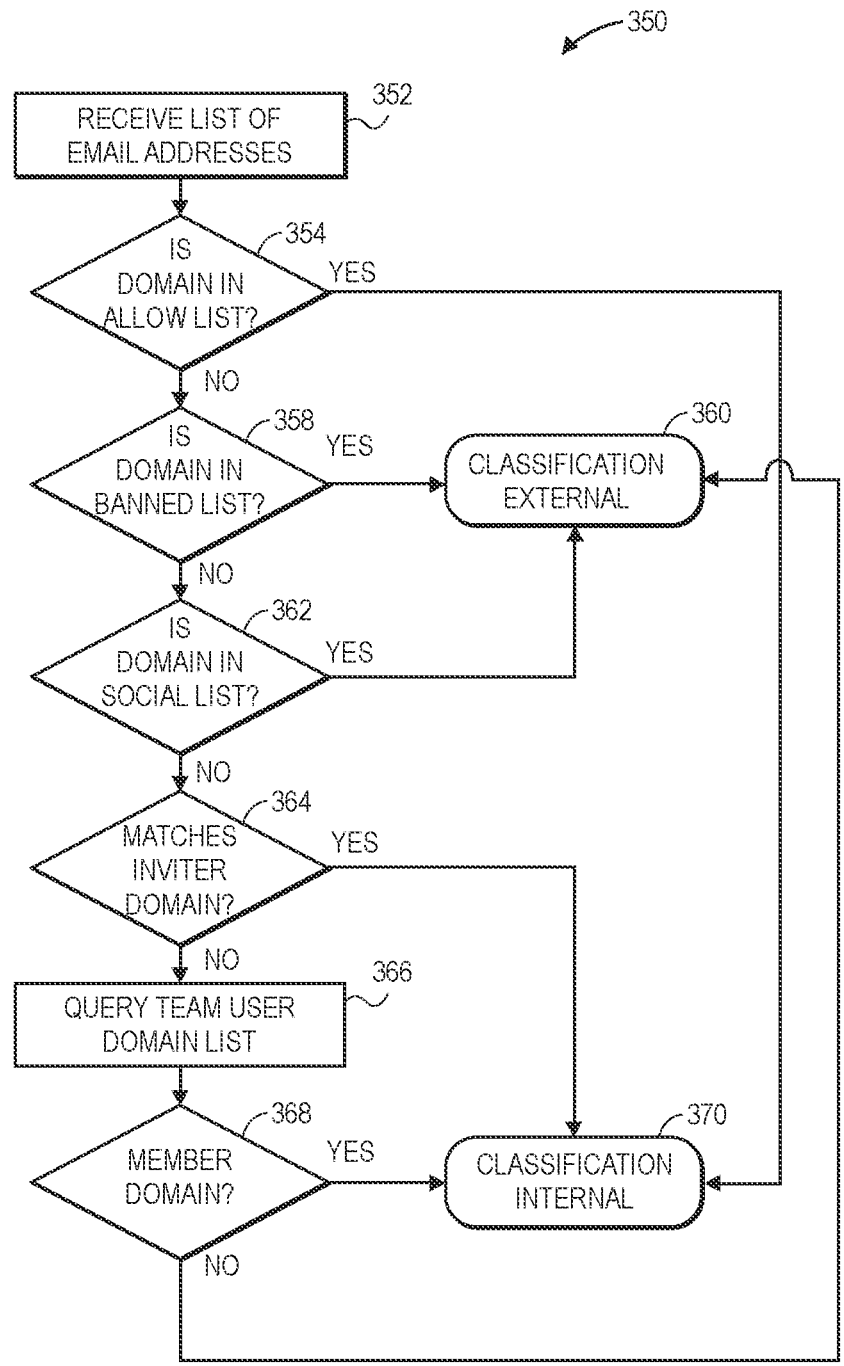
FIG. 3 depicts a flowchart illustrating the operation of an alternative method for processing a list of email addresses to be added in a group-based communication system.

Turning now to FIG. 3, a flowchart illustrating the operation of a method for adding a new user to a channel by selectively classifying user email domains is depicted and referred to generally by reference numeral 350. Processing begins at step 352 where the system receives a list of email addresses. In various embodiments, each of the email addresses are initially checked for validity or compliance with an applicable standard (such as, for example, RFC5322 from the Network Working Group of the Internet Engineering Task Force (IETF)). In various embodiments, the validity is established by reference to a suitable regular expression. In various embodiments, if the email address is invalid, an intermediate warning or error message is presented to the requesting user, and the email address is not accepted.

Next, the process continues to test 354 where the system determines whether the domain is contained within an allow-list associated with the group-based communication system. As used herein, an "allow list" is a list of explicitly authorized entities that have been granted permission to access to a particular privilege or service. It is the opposite of "deny list" or "block list." In various embodiments, test 354 consumes information from a data source containing team configuration information. In some embodiments, this data source is a static list maintained by an administrator of the group-based communication system. In other embodiments, an email address is considered internal if its email domain matches a domain configured by a workspace administrator as belonging to the allow-list. As used herein, team configuration information is information regarding members of a team within a workspace. In various embodiments, the administrator of the workspace provides team configuration information regarding domains that are explicitly on the domain allow list. If the particular domain is contained within such an allow list, processing proceeds to step 370 and the classification is determined to be "internal."

If the domain is not in the allow list, processing proceeds to test 358, where the system determines whether the domain is contained within a banned domain list (i.e., a block list). In various embodiments, this determination is made based on a data source containing configuration information regarding banned domain lists and stored in a data store associated with the group-based communication system. The classification engine references a list of email domains that are configured by an administrator to be banned from being added to workspace. In various embodiments, a classification API call on an email address with a domain in the list of banned domains returns a type of an empty string or "BLOCKED-DOMAIN". If the domain is found to be blocked, processing proceeds to step 360 and the classification is determined to be external.

If the domain is not found to be within the banned list, processing proceeds to test 362. At this step, the system evaluates whether the domain is contained within a social media list. As used herein, "social media list" refers to email address domains that are associated with general-use internet platforms, such as those used in connection with individual social media accounts or personal email accounts. This information is based on a social media configuration list that is contained in a data source for storing the social media list. In various embodiments, the administrator configures this list of social domains to include domains associated with social media type platforms or personal email accounts associated with users of the group-based communication system.

If the domain is on the social media list, processing proceeds on to step 360 and the classification is determined to be external; if the domain is not found within the social-media list, processing proceeds instead to test 364.

At test 364, the system determines whether the domain matches an inviter domain list. If the email has the same domain as the user who requested addition of the new user, the email is considered to be internal. This has the technological benefit of avoiding a database query round-trip into a data store containing information about the configured domains, thereby decreasing latency and reducing network bandwidth utilization.

If the domain does not match the inviter's domain, processing proceeds to step 366 and the team user domain list is queried. The team user domain list is a data source that contains information regarding all of the users in a particular team or workspace and a count of the number of users corresponding to a particular email address domain. At test 368, the system determines whether the domain being classified is contained within the team user domain list. If the email address domain is contained within the list, the domain is classified as internal at step 370. Alternatively, if the new user's domain is not one of the domains of the existing members, the domain is deemed to be external and processing proceeds to step 360. Under some circumstances, the classification engine may fail to access one of the data sources on which it bases a classification determination. In various embodiments, such a condition will cause an API error message response to be returned in response to a classification API call. In such a scenario, the requesting user may be presented with an error message and a recommendation to try again later. Alternatively, the user can be provided with additional information and provided with a full suite of options in the absence of a domain classification determination. In various embodiments, a catch-all rule is provided and any email or email domain that is not otherwise deemed to be internal is deemed to be external.

Figure 4:
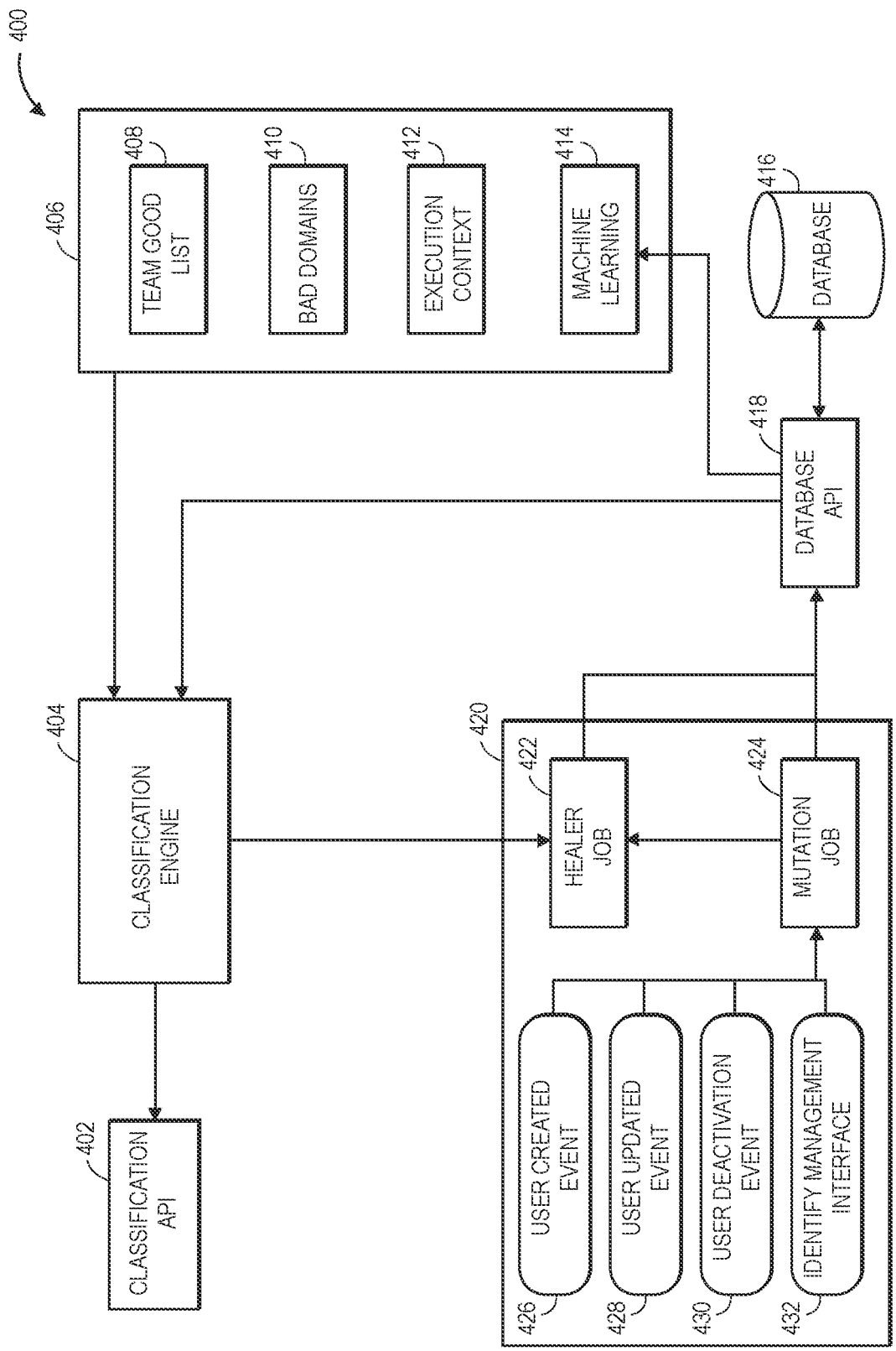
FIG. 4 depicts a block diagram corresponding to technical elements for classifying email domains and adding a new member to a group-based communication system.

Turning now to FIG. 4 a block diagram corresponding to technical elements for classifying email domains and adding new members to a group-based communication system is depicted and referred to generally by reference numeral 400. In various embodiments, a data model is provided with a table having fields including a team identifier, a domain, a count of users with that domain, a date last updated, and a role, with example roles being member, guest, and administrator. Each time a user is added or removed, or the user's role changes, this data source is updated, thereby keeping a count of users with particular roles from particular domains.

Block 402 represents a classification API interface or an endpoint, whereby the classification engine interface may be queried, using for example a representational state transfer (REST) API interface. In various embodiments, the classification engine interface is queried by the group-based communication system in order to determine an internal or external classification of a particular email address domain. This information is provided to the API endpoint by classification engine 404 which itself is in communication with a plurality of other data sources 406. The other data sources 406 comprise a team good list 408, a bad domains list 410, execution context 412, and machine learning data store 414. These additional data sources are persisted in connection with database 416 and accessed in connection with database API 418. The database 416 also provides information to classification engine 404 through the database API 418. In some embodiments, code associated with classification engine 404 may be called directly in the backend of an associated group-based communication system to access email domain classification functionality directly, without recourse to the API.

Various events 420 update the data model associated with the classification engine. Such events include user created events 426, user updated events 428, and user deactivation events 430. In various embodiments, by interfacing with an identity management system such as a cloud identity management system, events may be received from an identity management interface 432 as well. In various embodiments, all of these events are processed by a mutation job 424, which mutates and evolves the data store based on the above user events. The mutate job also provides information to the healer job 422, which processes information regarding the different users based on the events within the system based on the events within the system that users and the context associated with the users are updated and persisted to the database 416. Healer job 422 corrects any out-of-date information or any inconsistencies or internal contradictions in the database 416.

In various embodiments, results of the classification API call can be cached on the front-end; i.e., temporarily stored in memory in connection with code running on a client system such as the first client device 156 or the first smartphone client device 158. Because the various data stores associated with making a classification determination may not be updated as frequently as a classification determination is requested, client-side caching improves performance. Specifically, by way of machine learning, the group-based communication system computes a frequency of classification inflection (meaning how often a classification for a particular user would change) so that a period based on the classification inflection frequency can be applied to a cache refresh duration. In various embodiments, aspects of the group-based communication system that rely on classification information from a classification engine will cache the classifications for a period consistent with the cache refresh duration so as to reduce bandwidth to the classification engine and to increase performance of the client interface, because when a classification is cached it does not require an API round-trip to the classification engine, thereby increasing the interactive responsiveness at the client user interface. In this way, the front-end cache is refreshed at a period calculated and provided to the client by the group-based communication system roughly as frequently as the classification inflection frequency. This improves the user experience for the end-user.

Figure 5:
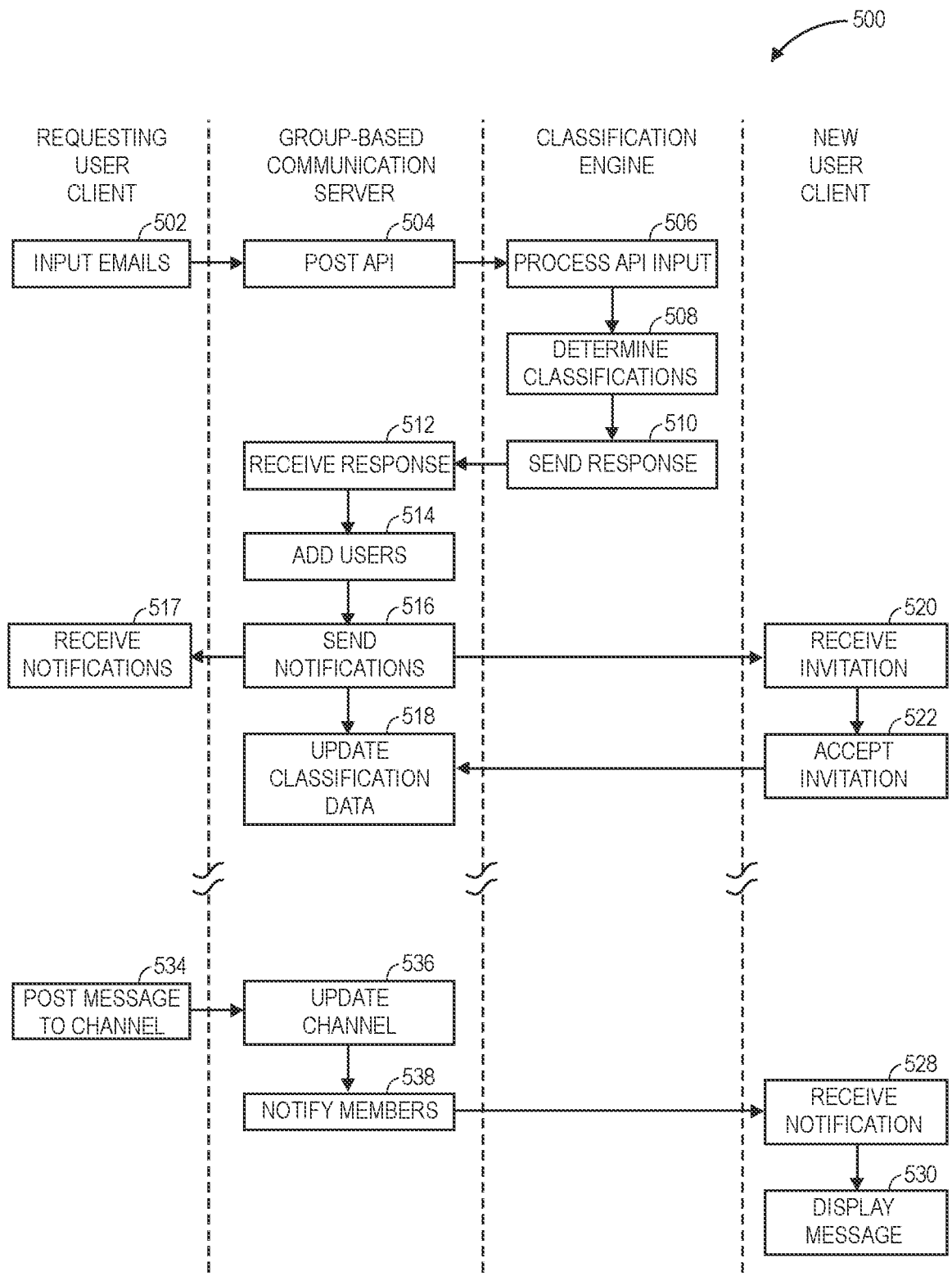
FIG. 5 depicts a swim lane diagram illustrating the component responsibility flow of a process in accordance with embodiments of the invention.

Turning now to FIG. 5, a swim lane diagram is depicted illustrating the component responsibility flow of a process in accordance with embodiments of the invention. The swim lane diagram is referred to generally by reference numeral 500. The process begins at step 502 with the client device (such as the first client device 156 or the first smartphone client device 158) of the requesting user receiving input from the requesting user that a list of users should be added to the channel. In various embodiments, the requesting user carries this out by inputting a list of emails. Alternatively, the requesting user inputs other identifying indicia associated with the list of users to be added. In some embodiments, the identifying indicia include a user's name or a username in the group-based communication system, as discussed above. In some embodiments, the requesting user starts typing characters and the group-based communication system provides suggestions as the requesting user types based on the requesting user's prior activity in connection with the group-based communication system.

Next, at step 504 the group-based communication system server posts an API call to the classification engine which at step 506 processes the API input. In some embodiments, the API POST input comprises a JSON list of email addresses corresponding to users to be added to the group-based communication system. In other embodiments, each email address is a distinct API call. In some embodiments, the API call is instead made via a simple object access protocol (SOAP) call with a list of email addresses in extensible markup language (XML) format.

Next, at step 508 the classification engine determines classifications (i.e., internal or external) associated with the list of email addresses provided in the previous step as, for example, discussed above with respect to FIG. 3. In various embodiments, the classification engine determines whether a new email address domain associated with each of the emails in the list of email addresses is internal or external by comparing the new domain to email address domains associated with the requesting user as well as with email address domains of members of the channel to which the new user is being added. The classification engine then formulates a response which it sends at step 510 back to the group-based communication system server. The group-based communication system server receives the response from the classification engine at step 512. At step 514, the group-based communication system server adds users to the group-based communication system associated with group-based communication system server. In various embodiments, these users are persisted in a group-based communication system data store associated with the group-based communication system. In some embodiments, some of the new users already have accounts in the group-based communication system, and some do not.

Next, at step 516, notifications regarding the addition of the new users are sent to the other components of the system. At step 520, a client computer associated with one of the new users receives a corresponding invitation, based on the addition of the user to the group-based communication system.

At step, 522 the new user accepts the invitation by way of the group-based communication application running on the new user client system. When the invitation is accepted, the group-based communication system server updates classification data associated with the channel at step 518.

Returning to step 516, in addition to sending a notification to the client system of the new user, the group-based communication system additionally sends a notification to the client system of the requesting user. The requesting user receives this notification at step 517. In various embodiments, the notification is presented to the requesting user by an automated channel monitoring and message posting tool associated with the group-based communication system that that the requesting user gains information regarding the status of the users that the requesting user added to the group-based communication channel.

Once the newly added user is added, the newly added user can view existing content associated with the channels to which the newly added user has been added, Moreover, the newly added user can receive notifications of newly posted messages in the channels as illustrated at step 534 when the requesting user posts a message to the channel. Upon the posting of a message to the channel, the group-based communication system server updates the channel at step 536. Once the channel is updated, the group-based communication system server notifies members of the channel of events occurring in-channel at step 538. Finally, at step 528, the newly added user receives the above notification, which at step 530 is displayed at the new user's client user interface.

Figure 6:
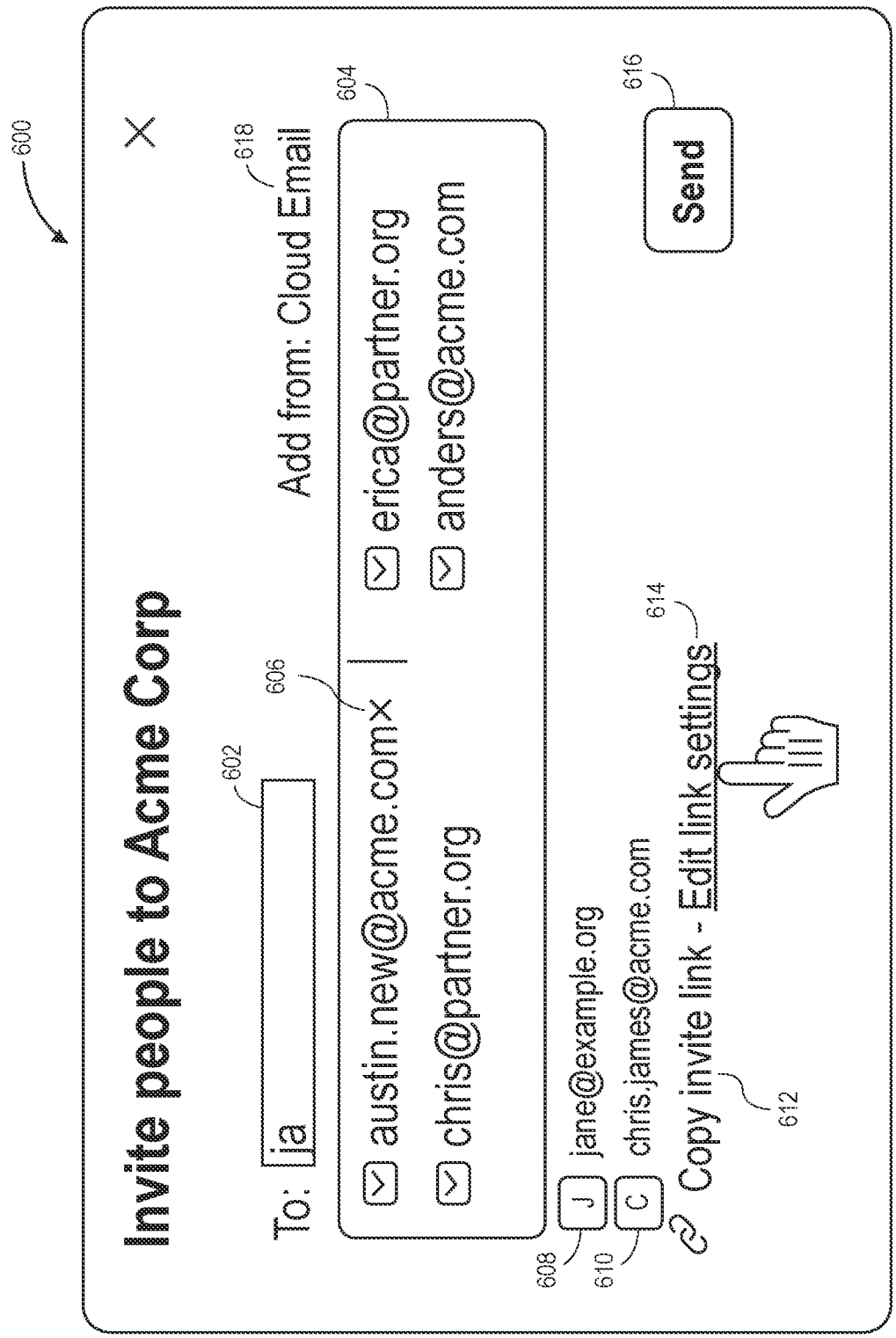
FIG. 6 depicts an exemplary user interface component for inviting users in a group-based communication system.

Turning now to FIG. 6, an exemplary user interface component 600 for inviting users in a group-based communication system is depicted. In various embodiments, when a requesting user wishes to add users to a channel within a group-based communication system, the user right clicks on the channel and selects "add users". In various alternative embodiments, the requesting user clicks or taps a button labeled "details" associated with the channel and then clicks or taps the "add users" icon. It is understood that other ways of indicating that the user wishes to add users to the channel are contemplated. In various embodiments, once the requesting user has indicated to the group-based communication system that the requesting user is requesting to add a list of users, the group-based communication system provides a user interface component such as user interface component 600.

In order to begin adding users, the requesting user can simply start typing names of persons, usernames, or email addresses to provide identifying indicia for the new users, as discussed above. In various embodiments, the modal user interface component 600 defaults to pre-selecting text field 602 such that any typed or otherwise input characters are directed to the text field 602. In various embodiments, the group-based communication system connects to a directory of contacts to provide suggested users to add.

As illustrated in FIG. 6, such a directory could be associated with a cloud email account as indicated by field 618. In various embodiments, the requesting user may click or tap the field 618 to change the directory that is selected. This directory could correspond to a lightweight directory access protocol (LDAP) server associated with an enterprise address book of the requesting user's employer or the contacts associated with a professional networking site. In various embodiments, the cloud email account associated with field 618. In this embodiment, the group-based communications system accesses the user's contacts list within the requesting user's cloud account to provide suggested users to add as the requesting user begins to type.

In this example, the user has begun to type the letters T and 'a' and as a result, the group-based communication system has suggested two possible users to add from the cloud email contacts list, namely first suggestion 608 "jane@example.org" and second suggestion 610 "chris.james@acme.com". The requesting user may then choose either of those possibilities and the email address will be added to an email address accumulation field 604 of FIG. 6. In various embodiments, if an invalid email address is provided (validity being evaluated as discussed above in connection with FIG. 3B) a warning message is presented to the requesting user and the invalidly formatted email address is not accepted as input into the email address accumulation field 604.

As shown, users having the validly formatted email addresses austin.new@acme.com, chris@partner.org, erica@partner.org, and anders@acme.com have already been added to the email address accumulation field 604. In some embodiments, removal icon 606 may be provided for each email that has been added to email address accumulation address field 604. In other embodiments, removal icon 606 may only appear if the requesting user hovers over a particular previously added email address. In various embodiments, the suggestion engine looks beyond the cloud email provider's contacts list and, for example, into a calendar associated with the cloud email provider for any email addresses of contacts with which the requesting user has planned or scheduled a meeting or video conference. In various embodiments, the user can copy the invite link by clicking the copy invite field 612, which will copy a URL to the clipboard so that the requesting user can type an email to one or more contacts who may want to join the workspace or channel. Alternatively, the requesting user can simply click send button 616 and cause the group-based communication system to automatically send an invitation link to the users in the email address accumulation field 604.

In various embodiments, the requesting user can click on the edit link settings field 614 to edit settings associated with the invitation link. These settings may include an option to deactivate the link or to provide an expiration time frame for the link such as, for example, one day or one week.

Figure 7:
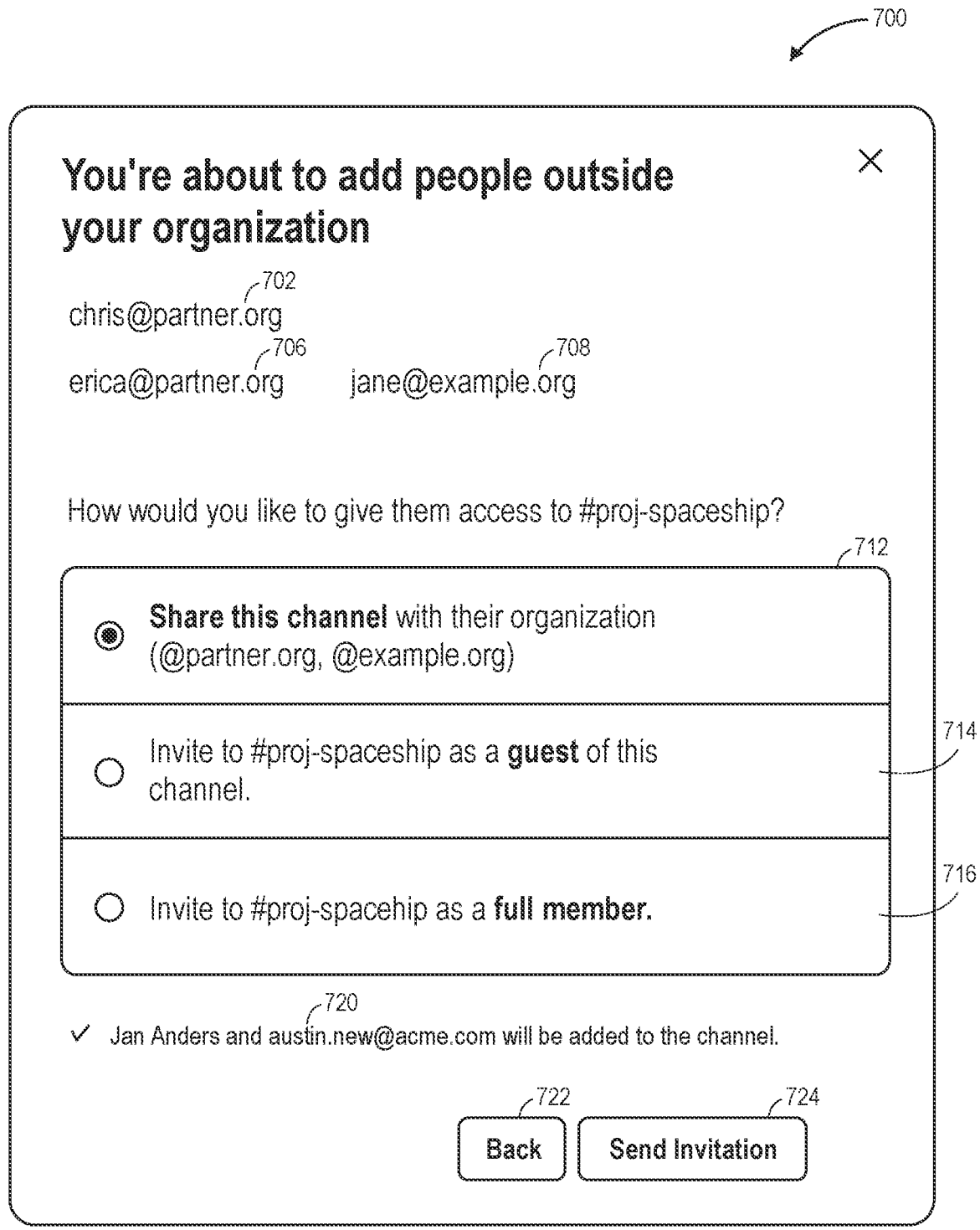
FIG. 7 depicts an exemplary user interface component for adding certain external users to channels in a group-based communication system.

Turning now to FIG. 7, an exemplary user interface component is depicted for adding certain external users to channels in a group-based communication system. In various embodiments, where the requesting user has added email addresses that are outside of the requesting user's organization in connection with user interface component 600, user interface component 700 may be displayed. In this case, the email addresses are associated with the users outside of the requesting user's organization, such as email addresses 702, 706, and 708. These email addresses are displayed in the user interface component 700, which is provided to facilitate the requesting user creating the type of access that is desired for the new users.

In this particular example, the requesting user has requested access to a channel called #proj-spaceship for the external users. As shown in the internal user list 720, the internal user Jan Anders and an internal user having email address austin.new@acme.com are not considered external users outside of the organization and therefore they will be directly added to the channel. In some embodiments, the requesting user is presented with one or more options for adding users outside of the requesting user's organization. In some such embodiments, the requesting user is provided with option 712, which allows the requesting user to share the channel with any needed external organizations (in this case, partner.org and example.org). In some such embodiments, the requesting user is further provided with option 714, which allows the requesting user to invite the external users to the channel as a guests. In some such embodiments, the requesting user is further provided with option 716, which allows the requesting user to invite the external users to become a full member of the channel by adding them to the workspace associated with the requesting user and of which the channel is a part. Once a selection has been made regarding how to add the users to the group-based communication system, the requesting user can click user interface button 724 to send the invitation. If the requesting user needs to add additional users or change a previously added user, the requesting user can activate the back button 722.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility and may be employed without reference to other features and sub combinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for adding new users to a shared channel in a group-based communication system, the method comprising:
    providing, to a first user of the group-based communication system, a first user interface component for receiving one or more requests to add one or more users to the shared channel, the one or more requests comprising a portion of at least one user identifier corresponding to the one or more users, the at least one user identifier includes an email domain;
    based on organization metadata between the one or more users and one or more other users of the group-based communication system, automatically classifying the at least one user identifier as being related to an organization corresponding to that of the first user based on organizational metadata identifying one or more domains previously associated with an organizational domain corresponding to the first user;
    in response to classifying the at least one user identifier as being related to the organization corresponding to that of the first user, providing a second user interface component for specifying whether the one or more users should be added to the shared channel; and
    adding the one or more users to the shared channel as members of the shared channel.

2. The method of claim 1, further comprising:
    automatically classifying the at least one user identifier as being related to the organization based on interaction metadata, wherein the interaction metadata comprises one or more prior interactions between the one or more other users and the email domain.

3. The method of claim 2, wherein the one or more prior interactions between the one or more other users and the email domain comprises metadata associated with communication data within the group-based communication system.

4. The method of claim 2, wherein the one or more prior interactions between the one or more other users and the email domain comprises metadata associated with a meeting scheduled in a calendar system.

5. The method of claim 2, wherein the one or more prior interactions between the one or more other users and the email domain comprises metadata associated with a plurality of messages, wherein each message of the plurality of messages is either posted to an organization channel or a direct message.

6. The method of claim 1, wherein the organization metadata includes information derived from a directory service.

7. The method of claim 1, wherein the at least one user identifier further includes a username.

8. The method of claim 1, wherein automatically classifying the at least one user identifier as being related to the organization corresponding to that of the first user involves comparing the email domain to a previously identified list of email domains previously associated with the organization.

9. An apparatus for adding new users to a shared channel in a group-based communication system, comprising:
    one or more memories storing processor-executable code; and
    one or more processors coupled with the one or more memories and individually or collectively operable to execute the code to cause the apparatus to:
    provide, to a first user of the group-based communication system, a first user interface component for receiving one or more requests to add one or more users to the shared channel, the one or more requests comprising a portion of at least one user identifier corresponding to the one or more users, the at least one user identifier includes an email domain;
    based on organization metadata between the one or more users and one or more other users of the group-based communication system, automatically classify the at least one user identifier as being related to an organization corresponding to that of the first user based on organizational metadata identifying one or more domains previously associated with an organizational domain corresponding to the first user;
    in response to classifying the at least one user identifier as being related to the organization corresponding to that of the first user, provide a second user interface component for specifying whether the one or more users should be added to the shared channel; and
    add the one or more users to the shared channel as members of the shared channel.

10. The apparatus of claim 9, wherein the one or more processors are individually or collectively further operable to execute the code to cause the apparatus to:
    automatically classify the at least one user identifier as being related to the organization based on interaction metadata, wherein the interaction metadata comprises one or more prior interactions between the one or more other users and the email domain.

11. The apparatus of claim 10, wherein the one or more prior interactions between the one or more other users and the email domain comprises metadata associated with communication data within the group-based communication system.

12. The apparatus of claim 10, wherein the one or more prior interactions between the one or more other users and the email domain comprises metadata associated with a meeting scheduled in a calendar system.

13. The apparatus of claim 10, wherein the one or more prior interactions between the one or more other users and the email domain comprises metadata associated with a plurality of messages, wherein each message of the plurality of messages is either posted to an organization channel or a direct message.

14. The apparatus of claim 9, wherein the organization metadata includes information derived from a directory service.

15. The apparatus of claim 9, wherein the at least one user identifier further includes a username.

16. The apparatus of claim 9, wherein automatically classifying the at least one user identifier as being related to the organization corresponding to that of the first user involves comparing the email domain to a previously identified list of email domains previously associated with the organization.

17. A non-transitory computer-readable medium storing code for adding new users to a shared channel in a group-based communication system, the code comprising instructions executable by one or more processors to:
provide, to a first user of the group-based communication system, a first user interface component for receiving one or more requests to add one or more users to the shared channel, the one or more requests comprising a portion of at least one user identifier corresponding to the one or more users, the at least one user identifier includes an email domain;
based on organization metadata between the one or more users and one or more other users of the group-based communication system, automatically classify the at least one user identifier as being related to an organization corresponding to that of the first user based on organizational metadata identifying one or more domains previously associated with an organizational domain corresponding to the first user;
in response to classifying the at least one user identifier as being related to the organization corresponding to that of the first user, provide a second user interface component for specifying whether the one or more users should be added to the shared channel; and
add the one or more users to the shared channel as members of the shared channel.

18. The non-transitory computer-readable medium of claim 17, wherein the instructions are executable by the one or more processors to:
automatically classify the at least one user identifier as being related to the organization based on interaction metadata, wherein the interaction metadata comprises one or more prior interactions between the one or more other users and the email domain.

19. The non-transitory computer-readable medium of claim 18, wherein the one or more prior interactions between the one or more other users and the email domain comprises metadata associated with communication data within the group-based communication system.

20. The non-transitory computer-readable medium of claim 18, wherein the one or more prior interactions between the one or more other users and the email domain comprises metadata associated with a meeting scheduled in a calendar system.

* * * * *